United States Patent
Ling et al.

(10) Patent No.: US 12,276,497 B2
(45) Date of Patent: Apr. 15, 2025

(54) PURE-ROLLING GENERATING MEASUREMENT METHOD AND DEVICE FOR GEAR HELIX ARTIFACT

(71) Applicants: DALIAN UNIVERSITY OF TECHNOLOGY, Liaoning (CN); GUANGXI ACADEMY OF SCIENCES, Guangxi (CN)

(72) Inventors: Siying Ling, Liaoning (CN); Xiaoyan Li, Liaoning (CN); Ming Ling, Liaoning (CN); Honglin Ren, Liaoning (CN); Zhimin Huang, Liaoning (CN); Xiaolin Wang, Liaoning (CN); Liding Wang, Liaoning (CN)

(73) Assignees: DALIAN UNIVERSITY OF TECHNOLOGY, Liaoning (CN); GUANGXI ACADEMY OF SCIENCES, Guangxi (CN)

( * ) Notice: Subject to any disclaimer, the term of this patent is extended or adjusted under 35 U.S.C. 154(b) by 0 days.

(21) Appl. No.: 17/911,560

(22) PCT Filed: Nov. 17, 2021

(86) PCT No.: PCT/CN2021/131152
§ 371 (c)(1),
(2) Date: May 25, 2023

(87) PCT Pub. No.: WO2023/087172
PCT Pub. Date: May 25, 2023

(65) Prior Publication Data
US 2023/0358524 A1    Nov. 9, 2023

(51) Int. Cl.
*G01B 7/28* (2006.01)

(52) U.S. Cl.
CPC ................................ *G01B 7/283* (2013.01)

(58) Field of Classification Search
USPC .................................................... 324/207.15
See application file for complete search history.

(56) References Cited

U.S. PATENT DOCUMENTS

2012/0139566 A1* 6/2012 Shimazawa ............ G11B 5/105
324/750.01

FOREIGN PATENT DOCUMENTS

| CN | 111060061 A | 4/2020 |
| CN | 113305733 A | 8/2021 |

(Continued)

*Primary Examiner* — Farhana A Hoque
(74) *Attorney, Agent, or Firm* — MUNCY, GEISSLER, OLDS & LOWE, P.C.

(57) ABSTRACT

A pure-rolling generating measurement method and device for gear helix artifact is proposed, which use a dividing table to accurately control the linear rail slide block assembly component to rotate according to the helix angle of different base circle. The height of the measuring point is the installation height of the working plane of generating rails, so as to ensure that the measuring point is always located on the dividing cylindrical surface of the gear helix artifact. When the gear helix artifact does pure-rolling motion, the slide block performs high-precision linear motion on the working surface of two fixed rails; the pure-rolling motion is proportional to the high-precision linear motion, so that the inductor micro-displacement probe can complete the measurement of the helix deviations of the gear helix artifact with different base circle helix angle.

5 Claims, 8 Drawing Sheets

(56) References Cited

FOREIGN PATENT DOCUMENTS

| | | | |
|---|---|---|---|
| CN | 113465535 | A | 10/2021 |
| CN | 113478024 | A | 10/2021 |
| JP | 2019215191 | A | 12/2019 |

* cited by examiner

PURE-ROLLING GENERATING MEASUREMENT METHOD AND DEVICE FOR GEAR HELIX ARTIFACT

FIELD OF THE INVENTION

The present invention belongs to the technical field of precision gear machining and measurement, which involves a pure-rolling generating measurement method and device for gear helix artifact.

BACKGROUND

The total deviation of helix is not only one of the mandatory inspection items in the national standard for gears GB/T 10095.1-2008, but also one of the default inspections items in the international standard for gears ISO 1328-1:2013(E), but also one of the bases for the division of master gear accuracy specified in the master gear verification regulation JJG 1008-2006. The datum for tracing the source of gear helix deviation and value transmission is the gear helix artifact. The involute helicoid of the gear helix artifact is the standard for verifying various gear helix instruments, which is used to transmit the parameter value of gear helix, correct the instrument indication value, determine the instrument indication error, etc. The gear helix artifact compares the helix on its working face with the helix formed by the instrument to determine the indication error of the instrument. The calibrated and corrected instrument is used for measuring workpieces with helix characteristics such as gears, worms and hobs. The Class-1 gear helix artifact is the highest datum for tracing the source of gear helix deviation and value transmission, which is transmitted down class by class according to the hierarchical relationship.

Based on gear helix artifact national standard GB/T 6468-2010, the accuracy class of gear helix artifact can be divided into Class-1 and Class-2. For radius of base circle is $r_b \leq 100$ mm and facewidth b>90 mm, 100 mm<$r_b \leq 200$ mm and facewidth b>60 mm, the helix form deviation of gear helix artifact is 1.2 μm, 1.5 μm respectively. The national standard for gears GB/T 10095.1-2008 stipulates that the helix form deviation of Class-0 gear artifact with the same parameters is 1.5 μm. Compared with the Class-0 gear artifact with the same parameters, the helix form tolerance of the Class-1 gear helix artifact is tightened by about 20%, and the manufacturing difficulty is higher than that of the Class-0 gear artifact. In year 2014, the National Institute of Metrology (NIM) of China has developed a high accurate gear measuring machine based on laser interferometry. The facewidth of the gear artifact used in the measurement is 160 mm, the diameter of the base circle is 200 mm, and the helix angle is 31°. Although the facewidth parameter of the gear artifact meets the requirements of the Class-1 gear helix artifact, the measurement result of the helix form deviation is about 3.0 μm, which cannot meet the requirements of the Class-2 gear helix artifact for the helix form deviation in China. In year 2004, the UK National Gear Metrology Laboratory (NGML), with the overall goal of reducing the measurement uncertainty, organized and coordinated various national metrological institutes to carry out the international comparison of profile and helix measurements. The comparison used a gear helix artifact with 200 mm diameter, 90 mm facewidth and helix angles of 0°, ±15°, ±30° and ±45°. Although the face width parameter of NGML gear helix artifact meet the specification requirements of Class-1 gear helix artifact in China, however the measurement result of helix form deviation is about 2 μm, which cannot meet the requirements of helix form deviation of Class-2 gear helix artifact in China. In year 2014, the Physikalisch-Technische Bundesanstalt (PTB) of Germany organized and coordinated various national metrological institutes to carry out the international comparison of gear artifact measurements. The comparison used a gear helix artifact with 204 mm diameter, 75 mm facewidth and helix angles of 0°, ±15°, ±30° and ±45°. The helix form deviation is about 0.5 μm. Its value can meet the requirements of Class-1 gear helix artifact for helix form deviation in China, but the facewidth parameter of PTB gear helix artifact do not meet the facewidth requirement specified by Class-1 gear helix artifact in China.

In the field of the large gear artifact: in year 2009, PTB manufacture a sector large gear artifact with tip diameter about 1000 mm, facewidth 400 mm, helix angles of 0° and 20° left-hand and 10° right-hand and the helix form deviation is about 5 μm, which is the gear artifact with the largest involute rolled length reported publicly. In year 2011, PTB design and manufacture a lager ring gear standard artifact with tip diameter about 2000 mm, facewidth 420 mm, and the helix form deviation is about 3 μm, which is the gear artifact with largest base diameter reported publicly. The NIM of China has also developed a large gear standard artifact with tip diameter about 1000 mm, however its manufacturing accuracy only between Class-4 and Class-2. The large gear artifacts above have large space and weight between 0.5 t and 2 t, which are inconvenient to carry. In addition, since this kind of gear artifact is designed with reference to the international standard for gears ISO 1328-1:2013 (E), it integrates gear involute artifact, gear helix artifact or pitch artifact. However, the helix form deviation of this kind of large gear artifact is much greater than 1.5 μm. They do not meet the basic requirements for the helix form deviation of Class-2 gear helix artifact according to national standard of gear helix artifact GB/T 6468-2010 in China.

The conventional measurement methods of helix deviation include generation method and coordinate method. The generation method takes the rotation axis of the measured gear as the datum, realizes the rotation of the gear to be measured and the movement of the probe along the axis with the high-precision transmission mechanism to form the theoretical helix track. The common measuring instruments include single-disc involute helix tester, multi-disc involute helix tester, lever-disc universal involute helix tester and lead tester. The coordinate method also takes the rotation axis of the gear to be measured as the datum, and measures the rotation coordinates and axial coordinates of the helix with the angle measuring device (dividing disc, circular grating) and length measuring device (laser, long grating). The common measuring instruments include gear measuring center (GMC), coordinate measuring machine (CMM) and helix artifact tester. The above measuring instruments are mostly used for the helix deviation measurement of gears. The GMC adapts to the development trend of gear measurement towards high precision, multi-function and automation, and has become the leading equipment in the field of gear measurement. The foreign advanced GMC can measure Class-2 gears, and domestic GMC can only measure Class-3 gears. It can be seen that its measurement accuracy is not high. The GMC is a four axis four coordinate measuring machine, which is equivalent to a CMM with a rotating shaft. Its error source must include 21 geometric errors of the CMM (9 translational errors, 9 rotational errors and 3 perpendicularity errors), 6 geometric errors of the rotating shaft (3 translational errors and 3 rotational errors), as well as the geometric errors caused by the probe, angle measuring device and the fixing of top and bottom centers. Therefore, the geometric error of the GMC reaches at least 30 items, and there are many error sources, which will have great influence on the measurement accuracy.

In order to meet the measurement requirements of high-precision gear helix deviation, countries have developed special measuring instruments to achieve the measurement of high-precision gear helix deviation and give the measurement uncertainty of the measuring instrument. In year 2005, PTB gave the measurement uncertainty $U_{95}$ of the measuring instrument is 1.1 µm, and the helix angle of the measured gear helix artifact is 0°~45°, and the reference diameter is 25 mm~400 mm. The gear helix measuring device developed by NIM was used in year 2015, and the helix slope deviation measurement uncertainty of main technical indicators are 0.9 µm~1.2 µm in order to verify the measuring capability of the high-precision gear measuring machine developed by National Metrology Institute of Japan (NMIJ) in year 2016, Osaka Seimitsu Kikai Co., Ltd. (OSK) uses DAT-1 super high precision gear machine to calibrate the helix artifact. The range of the correct able reference diameter is 20 mm~250 mm, the facewidth is 5 mm~100 mm, and the measurement uncertainty $U_{95}$ is 0.6 µm~1.2 µm. In conclusion, the above special measuring instruments cannot meet the requirements of helix deviation measurement of Class-1 gear helix artifact in China.

At present, it is still difficult for domestic manufacturers to manufacture Class-2 gear helix artifact. Therefore, no enterprise can master the processing technology of Class-1 gear helix artifact, and the measuring technology of gear helix artifact is still blank in China. The processing and measuring of Class-1 gear helix artifact is very difficult, and its precision index is also very strict. Invention patent (ZL201811078252.0) disclosed a Class-1 gear helix artifact, which only mentions the design structure and style of a kind of gear helix artifact. Invention patent (CN202110737588.9) disclosed a lapping device for gear helix artifact with equal common normal by rolling method, which only mentions a lapping device for gear helix artifact with equal common normal. The new structure and machining device of gear helix artifact is mentioned by disclosed patents, but none of them involve specific devices and methods for measuring gear helix artifact. Therefore, it is urgent to develop a gear helix artifact measuring method and device that meets the national gear standards in China.

SUMMARY

In order to accurately measure the helix deviation of high-precision gear helix artifact, according to the generation principle of involute helicoid, that is, when the plane is purely rolling around the base cylinder, the trajectory surface developed by a straight line obliquely staggered with the axis of the base cylinder at a constant angle in a fixed space is the involute helicoid. The present invention proposes a pure-rolling generating measurement method and device for the gear helix artifact, which drives the probe to make high-precision linear movement along the contact line direction of the involute helicoid, and continuously collects the helix deviation values on the dividing cylinder of the gear helix artifact.

Figure 1:
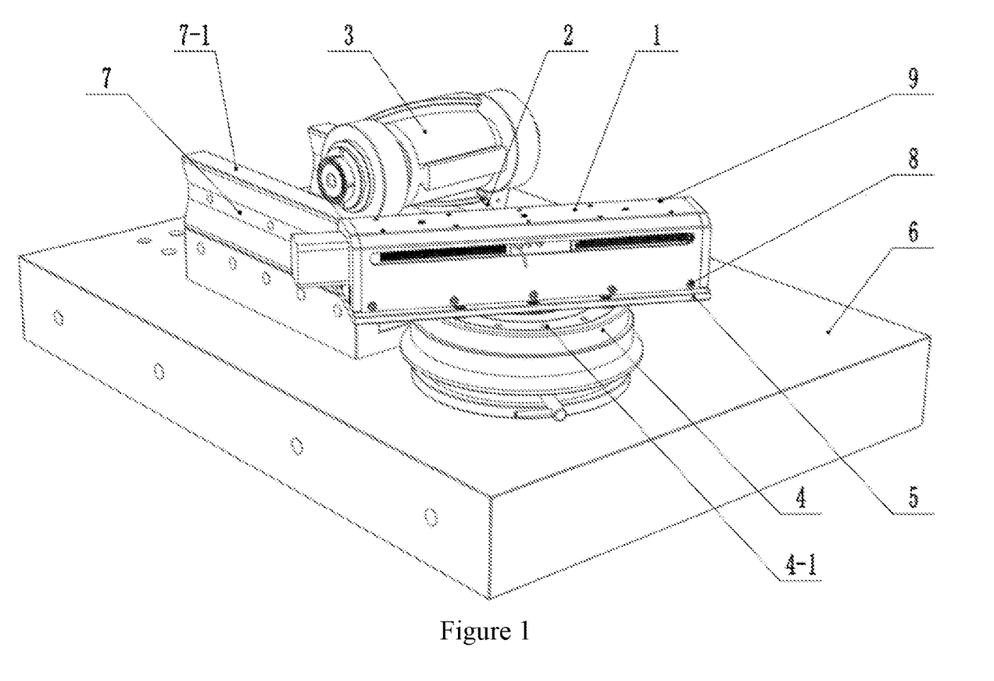
FIG. 1 illustrates the overall structure schematic diagram of pure-rolling generating measurement device of the invention.

In order to achieve the above purpose, the specific technical solutions are as follows:

Apure-rolling generating measurement device for gear helix artifact comprises the linear rail slide block assembly component 1, the helix artifact rolling component 3, an inductor micro-displacement probe 2, the generating rails 7, an adapter plate 5, a dividing table 4 and a marble base 6. The generating rails 7 and the dividing table 4 are fixed on the marble base 6, and the helix artifact rolling component 3 is located on the generating rails 7, and the linear rail slide block assembly component) is installed on the dividing table 4 with the adapter plate 5, and the inductor micro-displacement probe 2 is installed in the linear rail slide block assembly component 1.

The linear rail slide block assembly component consists of a fixed rail A 1-1, a fixed rail B 1-2, a floating rail 1-3, a dust cover 1-4, a motor fixed plate 1-5, a bearing fixed plate 1-6, a slide block 1-7, a screw-nut with flange 1-8, a ball screw 1-9, a coupling 1-10, a bearing 1-1 land a motor 1-12. The fixed rail A 1-1 and fixed rail B 1-2 are symmetrically arranged. After ultra-precision grinding, the working plane A of fixed rail 1-1-1, the working plane B of fixed rail 1-2-1, the assembly plane A of fixed rail 1-1-2 and the assembly plane B of fixed rail 1-2-2 have submicron plane accuracy. The top planes of the fixed rail A and the fixed rail B are provided with the counterbores of fixed rail A 1-1-4 and the counterbores of fixed rail B 1-2-4, and the fixed rail A 1-1 and the fixed rail B 1-2 are fixed on the adapter plate 5 by installing the connection screws in the counterbores. The assembly plane A of fixed rail 1-1-2 is closely assembled with the rail plane A of adapter plate 5-3, and the assembly plane B of fixed rail 1-2-2 is closely assembled with the rail plane B of adapter plate 5-4. The slide block 1-7 is located between two fixed rails, the working plane A of slide block 1-7-1 is closely assembled with the working plane A of fixed rail 1-1-1, the working plane B of slide block 1-7-2 is closely assembled with the working plane B of fixed rail 1-2-2, and the intersection line of the two working planes of fixed rails is parallel to the top plane of the slide block 1-7, the working plane C of slide block 1-7-3 is closely assembled with the working plane A of floating rail 1-3-1, and the working plane D of slide block 1-7-4 is closely assembled with the working plane B of floating rail 1-3-2. After ultra-precision grinding of the four working planes of the slide block, refer to the method of polytetrafluoroethylene (PTFE) lamination on the sliding rail described in the patent (CN202110052155. X), a PTFE rail soft belt can be pasted on the four working planes of the slide block 1-7, which can meet the accuracy requirements after scraping and grinding. Three through holes for installing probe 1-7-5 are designed on the flank of the longer side of the slide block 1-7. After installing the probe, it can be used to measure the helix deviation of left-hand, right-hand involute helicoid or involute cylindrical surface. The axes of three through holes for installing probe 1-7-5 are parallel to each other and parallel to the top plane of the slide block. The diameter of the through holes for installing probe 1-7-5 is slightly larger than that of the inductor micro-displacement probe 2. Each through hole for installing probe 1-7-5 has a screw hole 1-7-6 for installing the set screw with positioning ball 9 in the middle of the top plane of the slide block. The inductor micro-displacement probe 2 can be fixed by the structure of through holes and screw holes to prevent the inductor micro-displacement probe 2 from swinging up and down. The tightness of the set screws with positioning ball 9 is adjusted with the inner hexagonal wrench operation holes 1-4-2 of the top plane of the dust cover and the screw holes for tightening probe 1-3-3 of the floating rail 1-3. The screw-nut, flange and embedded oil nozzle are respectively installed with the through hole for installing screw nut 1-7-7, the screw holes for fixing flange 1-7-8 and the through hole for installing oil nozzle 1-7-9 on the flank of the shorter side of the slide block 1-7. One oil hole 1-7-10 is processed on the working plane A of slide block 1-7-1 and the working plane B of slide block 1-7-2 respectively, and one through hole for installing oil nozzle 1-7-9 is processed on the flank of the shorter side of the slide block. The oil hole 1-7-10 is connected with the through hole for installing oil nozzle 1-7-9. After the embedded oil nozzle is installed in the through hole for installing oil nozzle 1-7-9, the oil is introduced into the oil hole. The oil can be evenly distributed between the working plane A of slide block 1-7-1, the working plane B of slide block 1-7-2 and the PTFE rail soft belt to realize lubrication. The vertical plane A of fixed rail 1-1-3 and the vertical plane B of fixed rail 1-2-3 are provided with screw holes, and the dust cover 1-4 is fixed on the vertical plane A of fixed rail 1-1-3 and the vertical plane B of fixed rail 1-2-3 through the connection screws. Both ends of the two fixed rails are provided with screw holes, the motor fixed plate 1-5 is fixed at one end of the two fixed rails and bearing fixed plate 1-6 is fixed at the other end of the two fixed rails with the connection screws, respectively. The top plane of the dust cover 1-4 is provided with screw holes, and the set screws with positioning ball 9 are installed in the screw holes of dust cover 1-4-1. The floating rail 1-3 is fixed on the top plane of slide block 1-7, and the posture of the floating rail 1-3 is adjusted with the connection of set screws with positioning ball 9 to control the press force applied by the floating rail 1-3 to the slide block 1-7. The bearing 1-11 is installed at the shaft end of the ball screw 1-9 and placed in the through hole for installing bearing 1-6-2. The axis of the ball screw 1-9 is parallel to the intersection of the working plane A of slide block 1-7-1 and the working plane B of slide block 1-7-2. The motor 1-12 is installed in the through hole for installing motor shaft 1-5-3, and the motor 1-12 is connected with the ball screw 1-9 with the coupling 1-10. After the motor 1-12 drives the ball screw 1-9 to rotate, the slide block 1-7 move in a straight line. During the movement of slide block 1-7 from one end of two fixed rails to the other, use an altimeter to measure the height of the top plane of slide block. If there is a difference in the height value, grinding an area corresponding to the working plane A of fixed rail 1-1-1 and the assembly plane A of fixed rail 1-2-1 with a larger height value, so as to adjust the top plane of slide block to be at the same height.

Figure 5:
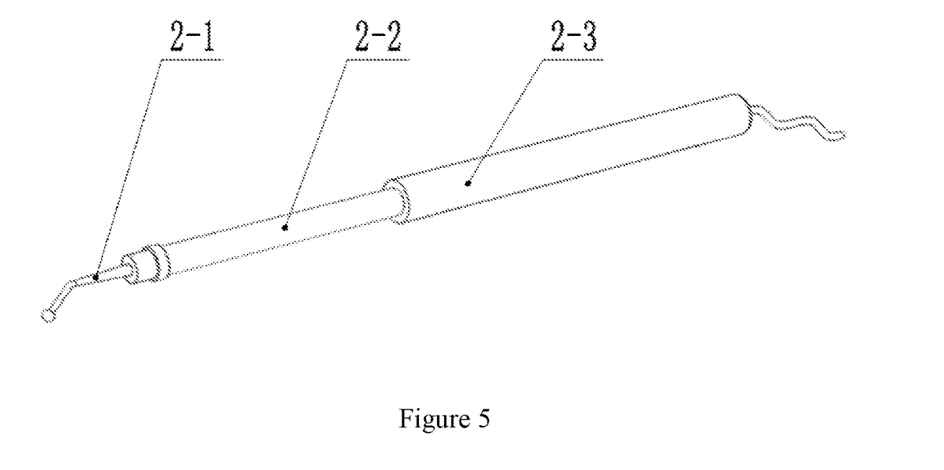
FIG. 5 illustrates the schematic diagram of inductor micro-displacement probe.

The inductor micro-displacement probe 2 comprising a ball probe 2-1, a probe extension rod 2-2, and an inductance micrometer measurement rod 2-3. The ball probe 2-1 and the inductance micrometer measurement rod 2-3 need to be connected with a probe extension rod 2-2. The installation height of inductor micro-displacement probe 2 is a fixed value, and the height value of the measuring point is the installation height of the working plane of generating rails 7-1. The measurement direction of inductor micro-displacement probe 2 is the normal direction of the flank of the gear helix artifact 3-5, and the tolerance direction specified by the helix deviation is the direction along the tangent of the base circle in the transverse plane. Therefore, the measurement direction proposed in this invention is inconsistent with the tolerance direction, and the original measurement data should be compensated the error by the measurement software. When the slide block 1-7 moves along the two fixed rails, the motion track of the inductor micro-displacement probe 2 is a straight line, which is parallel to the intersection of the working plane A of fixed rail 1-1-1 and the working plane B of fixed rail 1-2-1, the included angle with the ax is of gear helix artifact is the base circle helix angle, and the motion track of the measuring point is the contact line of the flank of gear helix artifact 3-5.

Figure 3:
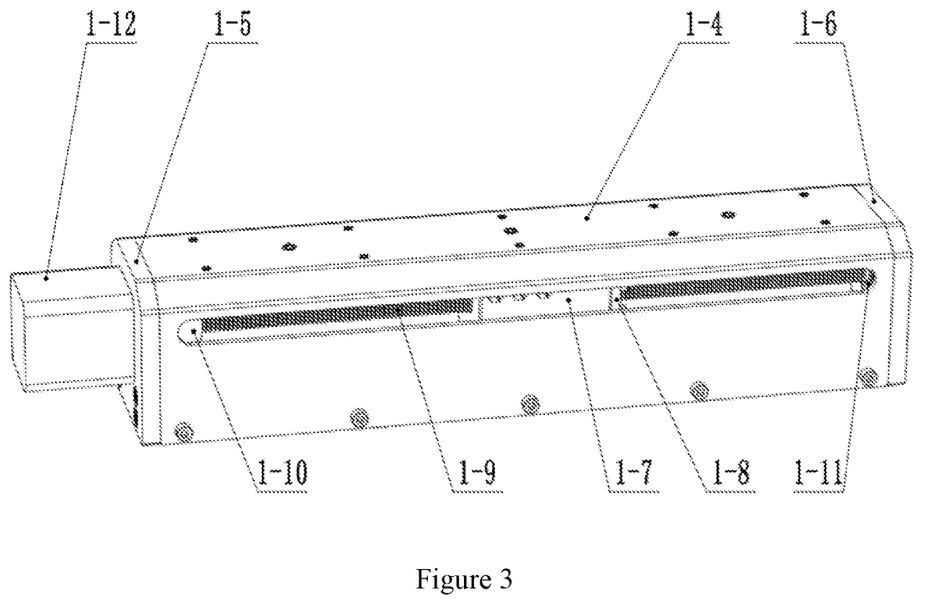
FIG. 3 illustrates the schematic diagram of linear rail slide block assembly component.
Figure 12:
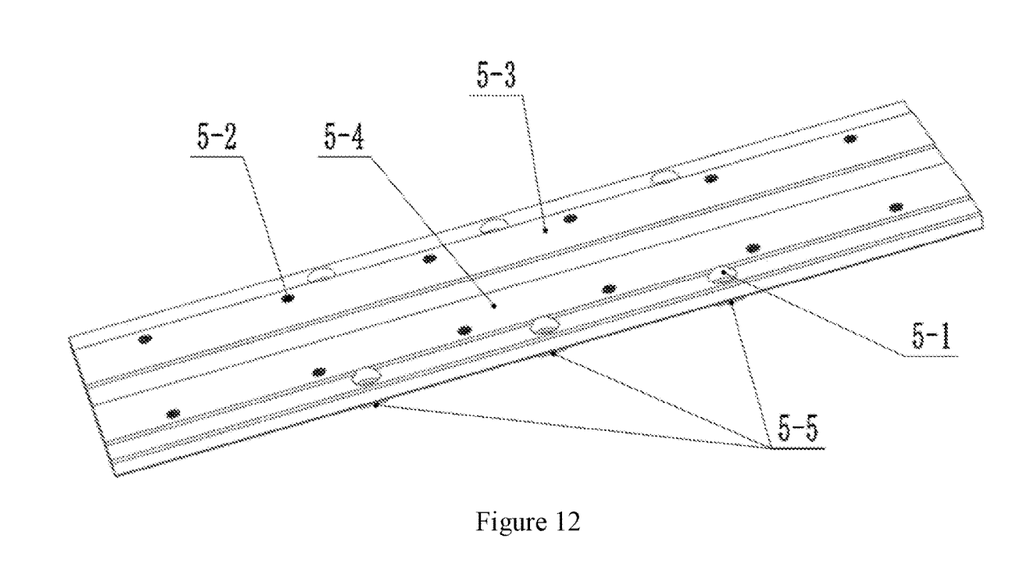
FIG. 12 illustrates the schematic diagram of adapter plate.

The linear rail slide block assembly component 1 is fixed on the dividing table 4 with the adapter plate 5. After ultra-precision grinding, the rail plane A of adapter plate 5-3, the rail plane B of adapter plate 5-4 and the assembly plane of adapter plate 5-5 have submicron plane accuracy. The adapter plate 5 is provided with counterbores 5-1, and the adapter plate 5 is fixed on the dividing table 4 with connection screws. The dividing table 4 is provided with the screw holes 4-1, and the assembly plane of adapter plate 5-5 is closely assembled with the dividing table 4. The dividing table 4 can realize the high-precision indexing of the linear rail slide block assembly component 1 according to the specific angle of any base circle spiral angle. The dividing table 4 is used to drive the rotation of linear rail slide block assembly component 1, which can adjust the angle between the intersection line of the working plane A of fixed rail 1-1-1 and the working plane B of fixed rail 1-2-1 and the axis of the gear helix artifact, and realize the helix deviation measurement of the gear helix artifact with arbitrary base circle helix angle.

Figure 4:
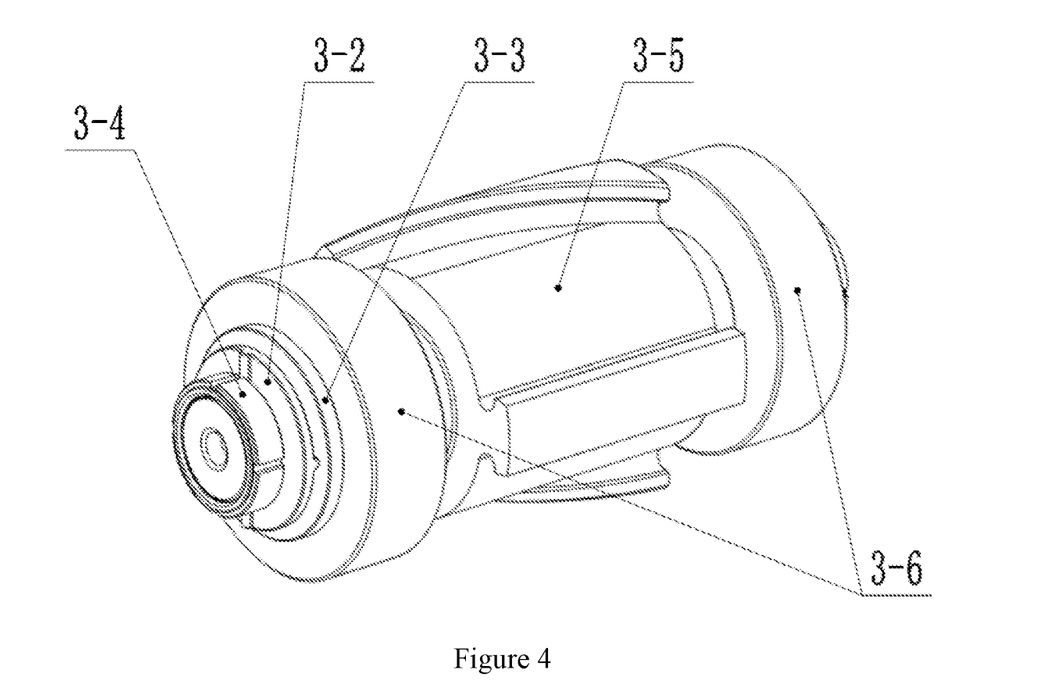
FIG. 4 illustrates the schematic diagram of helix artifact rolling component.
Figure 13:
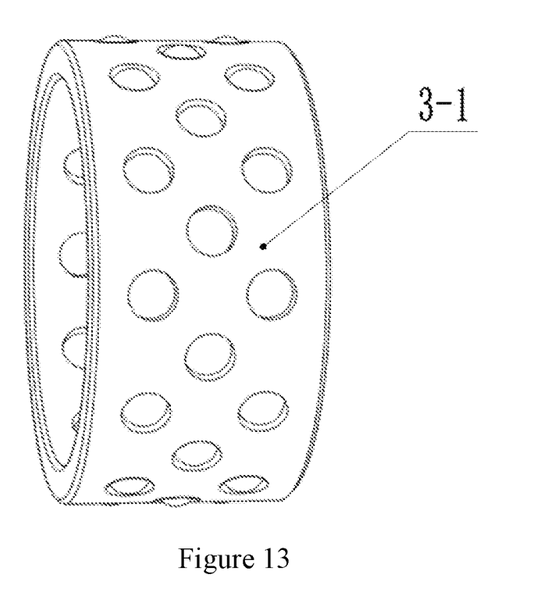
FIG. 13 illustrates the schematic diagram of multi-ball axle sleeve.

The helix artifact rolling component 3 consist of the multi-ball axle sleeves 3-1, the cross washers 3-2, the plain washers 3-3, the locking nuts 3-4, a gear helix artifact 3-5 and the base-circle plates 3-6. The two shaft ends of the gear helix artifact 3-5 are respectively equipped with a multi-ball axle sleeve 3-1, a cross washer 3-2 and a plain washer 3-3, and the gear helix artifact 3-5 is installed between the inner holes of the two base-circle plates 3-6 with a locking nut 3-4.

Figure 6:
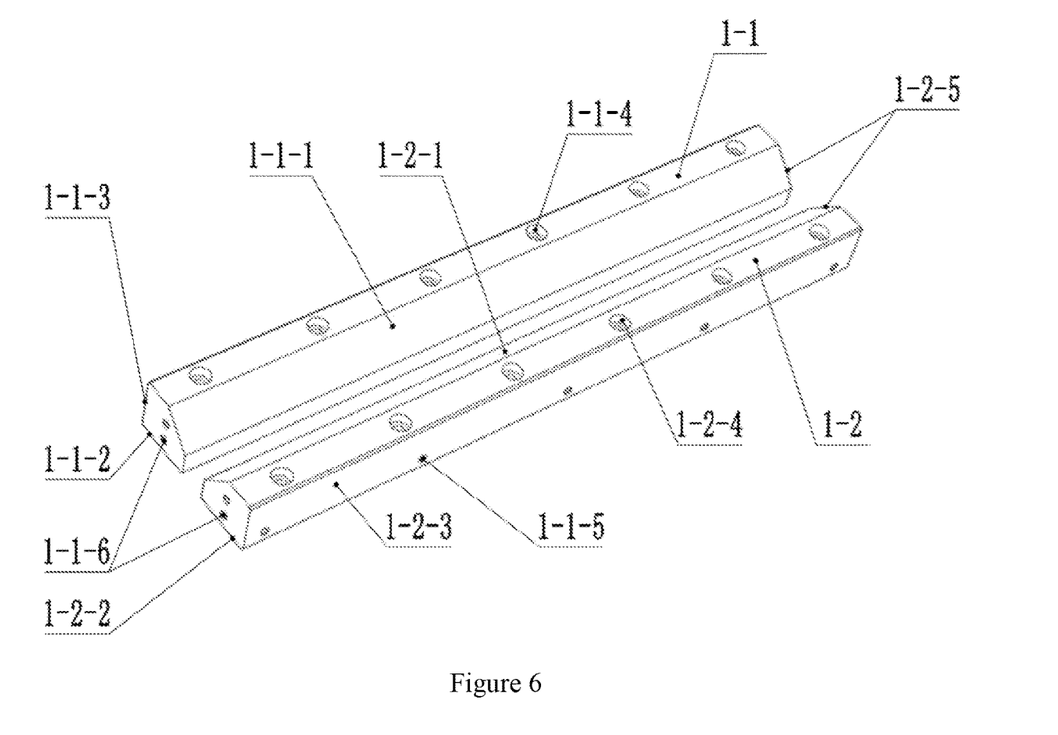
FIG. 6 illustrates the schematic diagram of the fixed rails.
Figure 7:
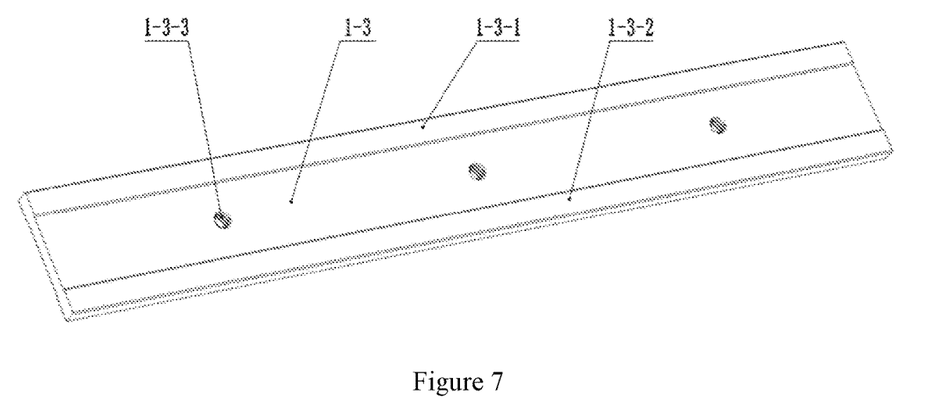
FIG. 7 illustrates the schematic diagram of floating rail.
Figure 8:
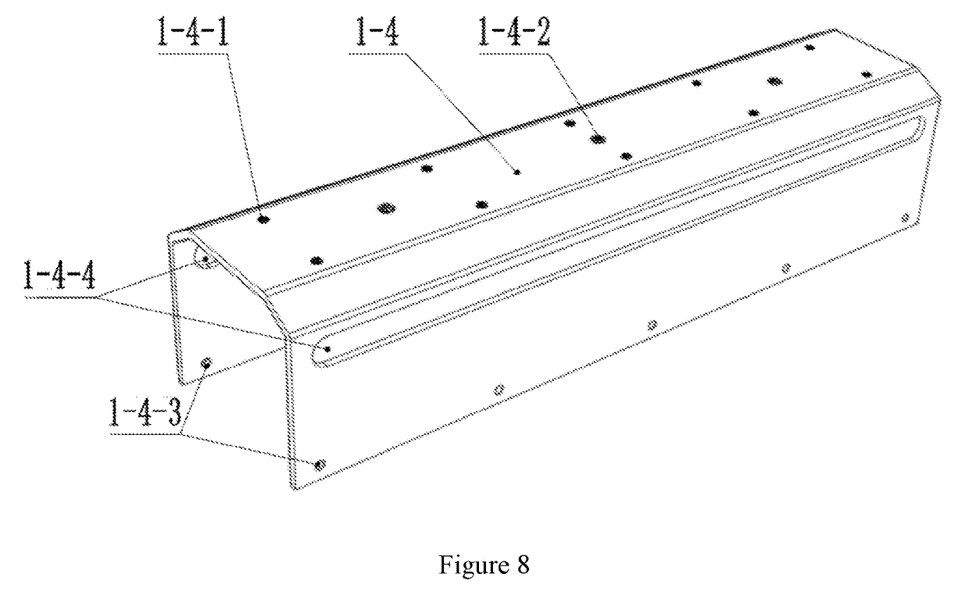
FIG. 8 illustrates the schematic diagram of dust cover.

Furthermore, both the included angle of the working plane A of fixed rail 1-1-1 and the assembly plane A of fixed rail 1-1-2, the working plane B of fixed rail 1-2-1 and the assembly plane B of fixed rail 1-2-2 are 45°, and the angle error is controlled within ±0.01°. The included angle of the working plane A of fixed rail 1-1-1 and the working plane B of fixed rail 1-2-1 is 60°~120°.

Figure 9:
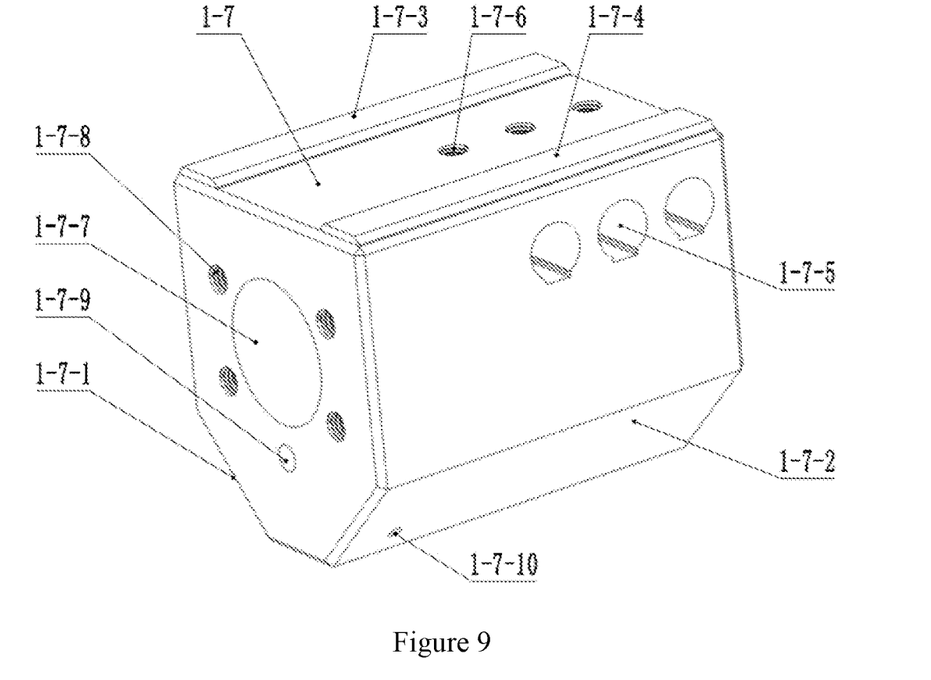
FIG. 9 illustrates the schematic diagram of slide block.
Figure 10:
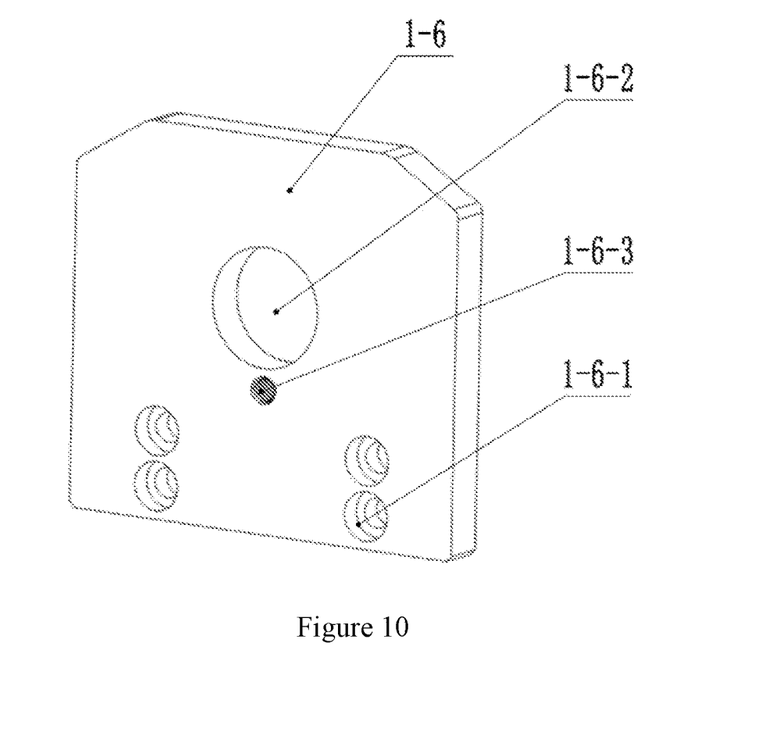
FIG. 10 illustrates the schematic diagram of bearing fixed plate.
Figure 11:
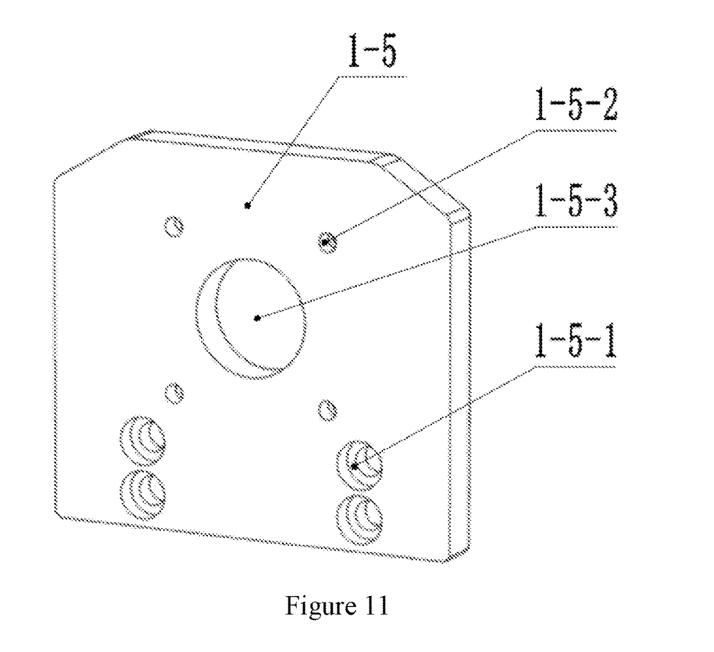
FIG. 11 illustrates the schematic diagram of motor fixed plate.

Furthermore, both the included angle of the working plane A of slide block 1-7-1, the working plane B of slide block 1-7-2 and the bottom plane of the slide block are 45°, and the angle error is controlled within ±0.01°.

Figure 2:
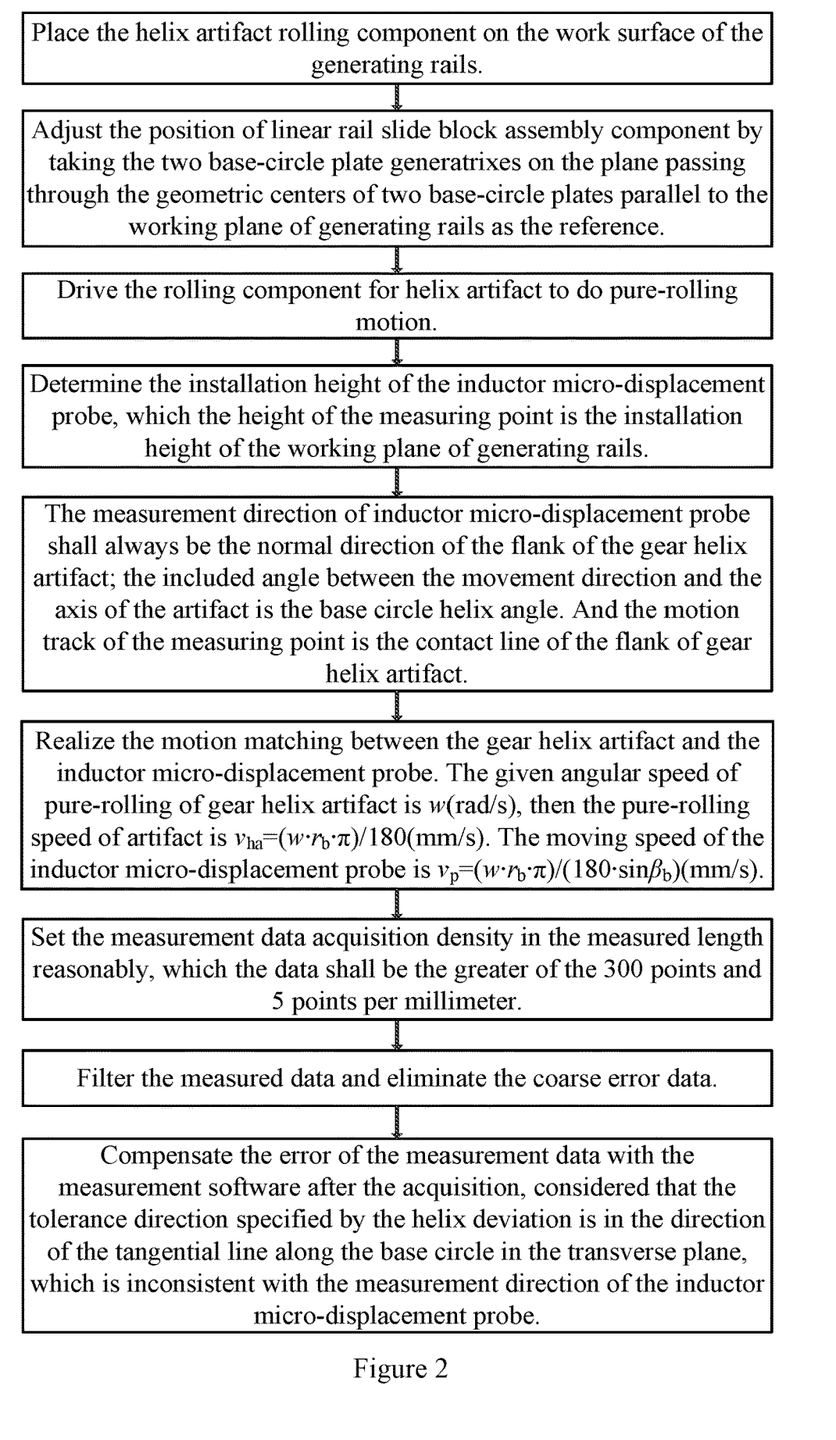
FIG. 2 illustrates the flowchart of pure-rolling generating measurement method of the invention.

The steps of a pure-rolling generating measurement method for the gear helix artifact are as follows:

(1) drive the gear helix artifact for pure-rolling generating motion;

the two shaft ends of the gear helix artifact 3-5 are respectively equipped with a multi-ball axle sleeve 3-1, a cross washer 3-2 and a plain washer 3-3, and the gear helix artifact 3-5 is installed between the inner holes of the two base-circle plates 3-6 with a locking nut 3-4; when the two base-circle plates 3-6 are rolled along the generating rails 7 to the middle position of the effective measuring stroke, measure the height of the two generatrix of the two base-circle plates 3-6 with the altimeter, and then adjust the position of linear rail slide block assembly component 1, in which the two base-circle plates generatrix on the plane passing through the geometric centers of two base-circle plates 3-6 and parallel to the working plane of generating rails 7-1; it can ensure that the two base-circle plates 3-6 always carry out pure-rolling generating motion along the extension direction of the working plane of generating rails, and drive the gear helix artifact 3-5 to carry out pure-rolling movement;

(2) determine the installation height and measurement direction of the inductor micro-displacement probe;

drive the dividing table 4 to rotate, and the rotation angle is the base circle helix angle of the gear helix artifact 3-5 to be measured, then the linear rail slide block assembly component 1 and the inductor micro-displacement probe 2 rotate the corresponding angle with the dividing table 4; the installation height of inductor micro-displacement probe 2 is a fixed value, in which the height of the measuring point is the installation height of the working plane of generating rails 7-1, so that the measurement is always carried out in the tangent plane of the base cylinder of the gear helix artifact 3-5; the inductor micro-displacement probe 2 shall be adjusted to the dividing circle along the tangent direction of the base circle of the gear helix artifact, and the measurement direction of inductor micro-displacement probe 2 shall always be the normal direction of the flank of the gear helix artifact; then the motion track of the inductor micro-displacement probe 2 is a straight line, which is parallel to the intersection of the working plane A of fixed rail 1-1-1 and the working plane B of fixed rail 1-2-1, and the included angle between the straight line and the axis of gear helix artifact is the base circle helix angle, and the motion track of the measuring point is the contact line of the flank of gear helix artifact;

(3) realize the motion matching between the gear helix artifact and the inductor micro-displacement probe;

the given angular speed of pure-rolling of gear helix artifact 3-5 is w(rad/s), then the pure-rolling speed of gear helix artifact is $v_{ha}=(w \cdot r_b \cdot \pi)/180$ (mm/s), and $r_b$ is the radius of the base cylinder of gear helix artifact; when the inductor micro-displacement probe 2 moving in a straight line in the direction of that forms a base circle helix angle $\beta_b$ with the axis of the base cylinder of the gear helix artifact, according to the trigonometric function relationship, it can be seen that the moving speed of the inductor micro-displacement probe is $v_p=(w \cdot r_b \cdot \pi)/(180 \cdot \sin \beta_b)$(mm/s); therefore, when the motion speeds of the gear helix artifact 3-5 and the inductor micro-displacement probe 2 meet the above two relations respectively, the proportional motion matching relationship is realized, which can ensure that the measuring point of the inductor micro-displacement probe 2 is always located on the dividing cylindrical surface of the gear helix artifact, and carry out real-time dynamic measurement along the contact line of the flank of gear helix artifact;

(4) set the measurement data acquisition density, filter and compensate the measured data;

when the measurement data acquisition density within the measured length is reasonably set, the data shall include a minimum 300 points or 5 points per millimeter, whichever is the greater; after the measurement data acquisition is completed, according to the judgment rules of coarse error, the data filtering is needed to eliminate the coarse error data; according to the verification method of helix deviation in the master gear verification regulation, the detection direction of inductor micro-displacement probe should be in the normal direction of the gear flank, while the tolerance direction specified by the helix deviation in the national standard of gears is in the direction of the tangential line along the base circle in the transverse plane; therefore, the tolerance direction of the gear helix artifact is inconsistent with the measurement direction of the inductor micro-displacement probe proposed in this patent; it is necessary to use the measurement software to compensate the data obtained by the inductor micro-displacement probe 2 according to the mathematical relationship between the measurement direction and the tolerance direction.

The invention has the beneficial effects that the invention use a dividing table to accurately control the linear rail slide block assembly component to rotate according to the helix angle of different base circle. Then, the measuring direction of the inductor micro-displacement probe is always in the normal direction of the flank of the gear helix artifact, and the included angle between its motion direction and the axis of the gear helix artifact is the base circle helix angle, and its motion trajectory is a straight line, and the motion trajectory of the measuring point is the contact line of the flank of the gear helix artifact. The height of the measuring point is the installation height of the working plane of generating rails, so as to ensure that the measuring point is always located on the dividing cylindrical surface of the gear helix artifact. When the gear helix artifact does pure-rolling motion, the slide block performs high-precision linear motion on the working surface of two fixed rails; the pure-rolling motion is proportional to the high-precision linear motion, so that the inductor micro-displacement probe can complete the measurement of the helix deviation of the gear helix artifact with different base circle helix angle. The precision of driving gear helix artifact for pure-rolling motion and the precision of inductor micro-displacement probe for high-precision linear motion do not directly affect the measurement accuracy. Therefore, there are few measurement-error sources and high measurement accuracy. The invention conform to the generation principle of the involute helicoid, and can realize the measurement of the helix deviation of the Class-1 gear helix artifact after error compensation.

wherein, 1 a linear rail slide block assembly component; 1-1*a* fixed rail A; 1-1-1 the working plane A of fixed rail; 1-1-2 the assembly plane A of fixed rail; 1-1-3 the vertical plane A of fixed rail; 1-1-4 the counter bores of fixed rail A; 1-1-5 the screw holes for dust cover; 1-1-6 the screw holes for motor fixed plate; 1-2*a* fixed rail B; 1-2-1 the working plane B of fixed rail; 1-2-2 the assembly plane B of fixed rail; 1-2-3 the vertical plane B of fixed rail; 1-2-4 the counter bores of fixed rail B; 1-2-5 the screw holes for bearing fixed plate; 1-3 a floating rail; 1-3-1 the working plane A of floating rail; 1-3-2 the working plane B of floating rail; 1-3-3 the screw holes for tightening probe; 1-4 a dust cover; 1-4-1 the screw holes of dust cover; 1-4-2 the inner hexagonal wrench operation holes; 1-4-3 the through holes for connecting fixed rail; 1-4-4 the slot holes of dust cover; 1-5 a motor fixed plate; 1-5-1 the counter bores of motor fixed plate; 1-5-2 the counter bores for fixing motor; 1-5-3 the through hole for installing motor shaft; 1-6 a bearing fixed plate; 1-6-1 the counter bores of bearing fixed plate; 1-6-2 the through hole for installing bearing; 1-6-3 oil injection hole; 1-7 a slide block; 1-7-1 the working plane A of slide block; 1-7-2 the working plane B of slide block; 1-7-3 the working plane C of slide block; 1-7-4 the working plane D of slide block; 1-7-5 the through holes for installing probe; 1-7-6 the screw holes for fixing probe; 1-7-7 the through hole for installing screw nut; 1-7-8 the screw holes for fixing flange; 1-7-9 the through hole for installing oil nozzle; 1-7-10 the oil holes; 1-8 a screw-nut with flange; 1-9 a ball screw; 1-10 a coupling; 1-11 a bearing; 1-12 a motor; 2 an inductor micro-displacement probe; 2-1 a ball probe; 2-2 a probe extension rod; 2-3 an inductance micrometer measurement rod; 3 a helix artifact rolling component; 3-1 the multi-ball axle sleeves; 3-2 the cross washers; 3-3 the plain washers; 3-4 the locking nuts; 3-5 a gear helix artifact; 3-6 the base-circle plates; 4 a dividing table; 4-1 the screw holes of dividing table; 5 an adapter plate; 5-1 the counter bores of adapter plate; 5-2 the screw holes for fixed rail; 5-3 the rail plane A of adapter plate; 5-4 the rail plane B of adapter plate; 5-5 the assembly plane of adapter plate; 6 a marble base; 7 generating rails; 7-1 the working plane of generating rails; 8 the connection screws; 9 the set screws with positioning ball.

DETAILED DESCRIPTION

The invention provides a pure-rolling generating measurement device for gear helix artifact, which is located outside all parts of pure-rolling. The measurement device comprises a linear rail slide block assembly component 1, an inductor micro-displacement probe 2, a helix artifact rolling component 3, a dividing table 4, an adapter plate 5, a marble base 6, the generating rails 7, the connection screws 8 and the set screws with positioning ball 9. Taking the facewidth of gear helix artifact as 100 mm, the base circle radius of gear helix artifact as 50 mm, the helix angle as 28°, the span between the generating rails as 140 mm and the height of the working plane of generating rails as 140 mm, the specific embodiment of the invention is described as follows.

The linear rail slide block assembly component) comprising a fixed rail A 1-1, a fixed rail B 1-2, a floating rail 1-3, a dust cover 1-4, a motor fixed plate 1-5, a bearing fixed plate 1-6, a slide block 1-7, a screw-nut with flange 1-8, a ball screw 1-9, a coupling 1-10, a bearing 1-11 and a motor 1-12. The GCr15 material with high hardness is selected for the fixed rails matrix. After quenching and tempering, the hardness of the fixed rails is high and uniform, and the wear resistance and fatigue resistance are high, and its comprehensive performance is good. The fixed rails after ultra-precision grinding, the flatness error of the working plane A of fixed rail 1-1-1 and the working plane B of fixed rail 1-2-1 is controlled within 3 μm, the flatness error of the assembly plane A of fixed rail 1-1-2, the assembly plane B of fixed rail 1-2-2, the vertical plane A of fixed rail 1-1-3 and the vertical plane B of fixed rail 1-2-3 is controlled within 5 μm. Both the included angle of the working plane A of fixed rail 1-1-1 and the assembly plane A of fixed rail 1-1-2, the working plane B of fixed rail 1-2-1 and the assembly plane B of fixed rail 1-2-2 are 45°, and the angle error is controlled within ±0.01°. The included angle of the working plane A of fixed rail 1-1-1 and the working plane B of fixed rail 1-2-1 is 90°. The fixed rail A 1-1 and fixed rail B 1-2 are symmetrically arranged. The slide block 1-7 is located between two fixed rails, the working plane A of slide block 1-7-1 is closely assembled with the working plane A of fixed rail 1-1-1, the working plane B of slide block 1-7-2 is closely assembled with the working plane B of fixed rail 1-2-1, and the intersection line of the two working faces of fixed rails is parallel to the top plane of the slide block. By installing the connection screws 8 in the counter bores of fixed rail A 1-1-4 and the counter bores of fixed rail B 1-2-4 respectively, the fixed rail A 1-1 and fixed rail B 1-2 are fixed on the adapter plate 5. The assembly plane A of fixed rail 1-1-2 is closely assembled with the rail plane A of adapter plate 5-3, and the assembly plane B of fixed rail 1-2-2 is closely assembled with the rail plane B of adapter plate 5-4. The adapter plate 5 is provided with the screw holes for fixed rail 5-2. The dust cover 1-4 is fixed on the vertical plane A of fixed rail 1-1-3 and the vertical plane B of fixed rail 1-2-3 by installing the connecting screws 8 in the through holes for connecting fixed rail 1-4-3 of the dust cover and the screw holes for dust cover 1-1-5 of the fixed rails. The motor fixed plate 1-5 is fixed to one end of the fixed rail A 1-1 and the fixed rail B 1-2 by installing the connecting screws 8 in the counter bores of motor fixed plate 1-5-1 and the screw holes for motor fixed plate 1-1-6. The bearing fixed plate 1-6 is fixed to the other end of the fixed rail A 1-1 and the fixed rail B 1-2 by installing the connecting screws 8 in the counter bores of bearing fixed plate 1-6-1 and the screw holes for bearing fixed plate 1-2-5. By installing set screws with positioning ball 9 in the screw holes of dust cover 1-4-1, the floating rail 1-3 can be fixed on the top plane of the slide block, wherein the working plane C of slide block 1-7-3 is closely assembled with the working plane A of floating rail 1-3-1, and the working plane D of slide block 1-7-4 is closely assembled with the working plane B of floating rail 1-3-2. The attitude of the floating rail 1-3 is adjusted by set screws with positioning ball 9 to control the press force applied by the floating rail 1-3 to the slide block 1-7. After ultra-precision grinding of the working plane A of slide block 1-7-1, the working plane B of slide block 1-7-2, the working plane C of slide block 1-7-3 and the working plane D of slide block 1-7-4, a PTFE rail soft belt can be pasted on the four working planes of the slide block, and the flatness error is controlled within 3 Both the included angle of the working plane A of slide block 1-7-1, the working plane B of slide block 1-7-2 and the bottom plane of the slide block are 45°, and the angle error is controlled within ±0.01°. The screw-nut with flange 1-8 can be fixed in the slide block 1-7 with the through hole for installing screw nut 1-7-7, and the flange can be fixed on the slide block 1-7 by installing the connecting screws 8 in the screw holes for fixing flange 1-7-8. The bearing 1-11 is installed at the shaft end of the ball screw 1-9 and placed in the through hole for installing bearing 1-6-2. The axis of the ball screw 1-9 is parallel to the intersection of the working plane A of slide block 1-7-1 and the working plane B of slide block 1-7-2. An oil hole 1-7-10 is machined on the working plane A of slide block 1-7-1 and the working plane B of slide block 1-7-2 respectively, and the through hole for installing oil nozzle 1-7-9 is machined on the flank of the shorter side of the slide block. The through hole for installing oil nozzle 1-7-9 is connected with the oil hole 1-7-10. After the embedded nozzle is installed in the through hole for installing oil nozzle 1-7-9, the oil is injected through the oil injection hole 1-6-3. The oil can be evenly distributed between the working plane A of slide block 1-7-1, the working plane B of slide block 1-7-2 and the PTFE rail soft belt, and to realize lubrication. Three through holes for installing probe 1-7-5 are designed on the flank of the longer side of the slide block. After installing the inductor micro-displacement probe 2, it can be used to measure the helix deviation of left-hand, right-hand involute helicoid or involute cylindrical surface. The axes of three through holes for installing probe 1-7-5 are parallel to each other and parallel to the top plane of the slide block. The diameter of the through holes for installing probe 1-7-5 is slightly larger than that of the inductor micro-displacement probe 2. Each through holes for installing probe 1-7-5 corresponds to the middle of the top plane of the slide block, there is a screw hole for fixing probe 1-7-6 for installing the set screws with positioning ball 9. The inductor micro-displacement probe 2 can be fixed by the structure of through holes and screw holes to prevent the inductor micro-displacement probe 2 from swinging up and down. The tightness of the set screws with positioning ball 9 is adjusted with the inner hexagonal wrench operation holes 1-4-2 of the top plane of the dust cover and the screw holes for tightening probe 1-3-3 of the floating rail. The motor 1-12 is installed in the through hole for installing motor shaft 1-5-3, and it is fixed in the motor fixed plate 1-5 by installing the connecting screws 8 in the counter bores for fixing motor 1-5-2. The motor 1-12 is connected with the ball screw 1-9 through the coupling 1-10. After the motor 1-12 drives the ball screw 1-9 to rotate, the slide block 1-7 move in a straight line. During the movement of slide block 1-7 from one end of two fixed rails to the other, use an altimeter to measure the height of the top plane of slide block. If there is a difference in the height value, grinding an area corresponding to the working plane A of fixed rail 1-1-1 and the assembly plane A of fixed rail 1-2-1 with a larger height value, so as to adjust the top plane of slide block to be at the same height.

The inductor micro-displacement probe 2 comprising a ball probe 2-1, a probe extension rod 2-2, and an inductance micrometer measurement rod 2-3. The span between the generating rails is 140 mm. In order to avoid interference between the inductor micro-displacement probe 2 and the generating rails 7, the ball probe 2-1 is selected as the probe. Considering that the position of the through holes for installing probe 1-7-5 is far from the starting point on the gear helix artifact 3-5, the ball probe 2-1 and the inductance micrometer measurement rod 2-3 need to be connected with a probe extension rod 2-2. The installation height of inductor micro-displacement probe 2 is a fixed value, and the height value of the measuring point is the installation height of the working plane of generating rails 7-1 as 140 mm. The measurement direction of inductor micro-displacement probe 2 is the normal direction of the flank of gear helix artifact 3-5, and the tolerance direction specified by the helix deviation is the direction along the tangent of the base circle in the transverse plane. Therefore, the measurement direction proposed in this patent is inconsistent with the tolerance direction, and the original measurement data should be compensated the error by the measurement software. When the slide block 1-7 moves along the working plane of two fixed rails, the motion track of the inductor micro-displacement probe 2 is a straight line, which is parallel to the intersection of the working plane A of fixed rail 1-1-1 and the working plane B of fixed rail 1-2-1, the included angle with the axis of gear helix artifact 3-5 is the base circle helix angle as 28°, and the motion track of the measuring point is the contact line of the flank of gear helix artifact.

The linear rail slide block assembly component 1 is fixed on the dividing table 4 with the adapter plate 5. After ultra-precision grinding, the rail plane A of adapter plate 5-3, the rail plane B of adapter plate 5-4 and the assembly plane of adapter plate 5-5, and the flatness error is controlled within 5 µm. The dividing table 4 is installed on the marble base 6. The dividing table 4 is provided with the screw holes of dividing table 4-1, which is connected with the counter bores of adapter plate 5-1 with the connecting screws 8 to realize the connection between the dividing table 4 and the adapter plate 5. The assembly plane of adapter plate 5-5 is closely assembled with top plane of the dividing table. The dividing table 4 can realize the high-precision dividing of the linear rail slide block assembly component 1 according to the specific angle of any base circle helix angle.

Drive the helix artifact rolling component 3 to roll purely on the generating rails 7, then the rolling direction of the gear helix artifact 3-5 is parallel to the extension direction of generating rails, the radius of the two base-circle plates 3-6 are 50 mm, the facewidth of the gear helix artifact 3-5 is 100 mm, the radius of the base circle cylinder is 50 mm, the base circle helix angle is 28°, and the height of the working plane of generating rails 7-1 is 140 mm. The steps of a pure-rolling generating measurement method for the gear helix artifact are as follows:

(1) drive the gear helix artifact for pure-rolling generating motion;

the two shaft ends of the gear helix artifact are respectively equipped with a multi-ball axle sleeve 3-1, a cross washer 3-2 and a plain washer 3-3, and the gear helix artifact 3-5 is installed between the inner holes of the two base-circle plates with a locking nut 3-4; when the two base-circle plates 3-6 are rolled to the middle position of the effective measuring stroke, measure the height of the two generatrix of the two base-circle plates 3-6 with the altimeter, and then adjust the position of linear rail slide block assembly component 1, in which the two base-circle plates generatrix on the plane passing through the geometric centers of two base-circle plates and parallel to the working plane of generating rails 7-1; it can ensure that the two base-circle plates 3-6 always carry out pure-rolling generating motion along the extension direction of the working plane of generating rails 7-1, and drive the gear helix artifact 3-5 to carry out pure-rolling movement;

(2) determine the installation height and measurement direction of the inductor micro-displacement probe;

drive the dividing table 4 to rotate the base circle helix angle±$\beta_b$ of gear helix template 3-5, then fixing the indexing table 4, so the linear rail slide block assembly component 1 and the inductor micro-displacement probe 2 rotate the corresponding base circle helix angle±$\beta_b$ with the dividing table 4; the installation height of inductor micro-displacement probe 2 is a fixed value, in which the height of the measuring point is the installation height of the working plane of generating rails 7-1 as 140 mm, so that the measurement is always carried out in the tangent plane of the base cylinder of the gear helix artifact 3-5; the inductor micro-displacement probe 2 shall be adjusted to the dividing circle along the tangent direction of the base circle of the gear helix artifact, and the measurement direction of inductor micro-displacement probe 2 shall always be the normal direction of the flank of the gear helix artifact, this direction differs from the tolerance direction of the gear helix by a base circle helix angle $\beta_b$, therefore error compensation is required; then the motion track of the inductor micro-displacement probe 2 is a straight line, which is parallel to the intersection of the working plane A of fixed rail 1-1-1 and the working plane B of fixed rail 1-2-1, and the included angle between the straight line and the axis of gear helix artifact is the base circle helix angle as 28°, and the motion track of the measuring point is the contact line of the flank of gear helix artifact;

(3) realize the motion matching between the gear helix artifact and the inductor micro-displacement probe;

the given angular speed of pure-rolling of gear helix artifact 3-5 is w(rad/s), then the pure-rolling speed of gear helix artifact 3-5 is $v_{ha}=(w \cdot r_b \cdot \pi)/180$ (mm/s), and r is the radius of the base cylinder of gear helix artifact; when the inductor micro-displacement probe 2 moving in a straight line in the direction of that forms a base circle helix angle $\beta_b$ with the axis of the base cylinder of the gear helix artifact, according to the trigonometric function relationship, it can be seen that the moving speed of the inductor micro-displacement probe 2 is $v_p=(w \cdot r_b \cdot \pi)/(180 \cdot \sin \beta_b)$ (mm/s); therefore, when the motion speeds of the gear helix artifact 3-5 and the inductor micro-displacement probe 2 meet the above two relations respectively, the proportional motion matching relationship is realized, which can ensure that the measuring point is always located on the dividing cylindrical surface of the gear helix artifact, and carry out real-time dynamic measurement along the contact line of the flank of gear helix artifact;

(4) set the measurement data acquisition density, filter and compensate the measured data;

during the measurement of helix deviation of gear helix artifact 3-5, it is very important to reasonably set the sampling interval of each group of data; if the sampling interval is too small, too much data will be collected, and invalid error signals may be collected; if the sampling interval is too large, necessary sampling points will be missed, resulting in measurement errors; combined with the engineering practice, the helix measurement data shall include a minimum 300 points or 5 points per millimeter, whichever is the greater; in the measurement process, the data collected by the inductor micro-displacement probe 2 may deviate greatly from the real value due to the accidental failure of the measurement system, sudden change of the surrounding environment, abnormal data interpretation process and other factors; therefore, after the data acquisition is completed, data filtering shall be carried out to eliminate the coarse error data according to the judgment rules of coarse error; according to the verification method of helix deviation in the standard gear verification regulation, the detection direction of inductor micro-displacement probe 2 should be in the normal direction of the gear flank, while the tolerance direction specified by the helix deviation in the national standard of gears is in the direction of the tangential line along the base circle in the transverse plane; therefore, the tolerance direction of the gear helix artifact is inconsistent with the measurement direction of the inductor micro-displacement probe 2 proposed in this patent; it is necessary to use the measurement software to compensate the data obtained by the inductor micro-displacement probe 2 according to the mathematical relationship between the measurement direction and the tolerance direction, and the compensation coefficient is $1/\cos \beta_b$.

The above descriptions only express the implements of the invention, but cannot be understood as limiting the scope of the patent of the invention. It should be noted that for those skilled in the art, several modifications and improvements can be made without departing from the concept of the invention, which belong to the protection scope of the invention.

The invention claimed is:

1. A pure-rolling generating motion measurement device for gear helix artifact, wherein it comprises: the linear rail slide block assembly component, the helix artifact rolling component, an inductor micro-displacement probe, the generating rails, an adapter plate, a dividing table and a marble base; the generating rails and the dividing table are fixed on the marble base, and the helix artifact rolling component is located on the generating rails, and the linear rail slide block assembly component is installed on the dividing table with the adapter plate, and the inductor micro-displacement probe is installed in the linear rail slide block assembly component;

wherein the linear rail slide block assembly component consists of a fixed rail A, a fixed rail B, a floating rail, a dust cover, a motor fixed plate, a bearing fixed plate, a slide block, a screw-nut with flange, a ball screw, a coupling, a bearing and a motor; the fixed rail A and fixed rail B are symmetrically arranged; after ultra-precision grinding, the working plane A of fixed rail, the working plane B of fixed rail, the assembly plane A of fixed rail and the assembly plane B of fixed rail have submicron plane accuracy; the fixed rail A and the fixed rail B are fixed on the adapter plate; the assembly plane A of fixed rail is closely assembled with the rail plane A of adapter plate, and the assembly plane B of fixed rail is closely assembled with the rail plane B of adapter plate; the slide block is located between two fixed rails, the working plane A of slide block is closely assembled with the working plane A of fixed rail, the working plane B of slide block is closely assembled with the working plane B of fixed rail, and the intersection line of the two working planes of fixed rails is parallel to the top plane of the slide block; the working plane C of slide block is closely assembled with the working plane A of floating rail, and the working plane D of slide block is closely assembled with the working plane B of floating rail; three through holes for installing probe are designed on the flank of the longer side of the slide block; after installing the probe, it can be used to measure the helix deviation of left-hand, right-hand involute helicoid or involute cylindrical surface; each through hole for installing probe corresponds to the top plane of the slide block, which is used to install the set screw with positioning ball; the inductor micro-displacement probe can be fixed by the structure of through holes and screw holes to prevent the inductor micro-displacement probe from swinging up and down; the screw-nut, flange and embedded oil nozzle are installed in the flank of the shorter side of the slide block, and one through hole for installing oil nozzle is processed on this flank; one oil hole is processed on the working plane A of slide block and the working plane B of slide block respectively, and the oil hole is connected with the through hole for installing oil nozzle; the oil can be evenly distributed between the working plane A of slide block, the working plane B of slide block and the PTFE rail soft belt to realize lubrication; the motor fixed plate is fixed at one end of the two fixed rails and the bearing fixed plate is fixed at the other end of the two fixed rails; the dust cover is fixed on the vertical plane A of fixed rail and the vertical plane B of fixed rail; the set screws with positioning ball are installed in the screw holes of dust cover; the floating rail is fixed on the top plane of slide block, and the posture of the floating rail is adjusted with the connection of set screws with positioning ball to control the press force applied by the floating rail to the slide block; the bearing is installed at the shaft end of the ball screw; the axis of the ball screw is parallel to the intersection of the working plane A of slide block and the working plane B of slide block; the motor drives the ball screw to rotate, then the slide block move in a straight line; during the movement of slide block from one end of two fixed rails to the other, use an altimeter to measure the height of the top plane of slide block; if there is a difference in the height value, grinding an area corresponding to the working plane A of fixed rail and the assembly plane A of fixed rail with a larger height value, so as to adjust the top plane of slide block to be at the same height;

the inductor micro-displacement probe consists of a ball probe, an inductance micrometer measurement rod, and a probe extension rod for connecting the two parts; the installation height of inductor micro-displacement probe is a fixed value, and the height value of the measuring point is the installation height of the working plane of generating rails; the measurement direction of inductor micro-displacement probe is the normal direction of the flank of the gear helix artifact When the slide block moves along the two fixed rails, the motion track of the inductor micro-displacement probe is a straight line, which is parallel to the intersection of the working plane A of fixed rail and the working plane B of fixed rail, the included angle with the axis of gear helix artifact is the base circle helix angle, and the motion track of the measuring point is the contact line of the flank of gear helix artifact;

the linear rail slide block assembly component is fixed on the dividing table with the adapter plate; after ultra-precision grinding, the rail plane A of adapter plate, the rail plane B of adapter plate and the assembly plane of adapter plate have submicron plane accuracy; the adapter plate is fixed on the dividing table, and the assembly plane of adapter plate is closely assembled with the dividing table; the dividing table can realize the high-precision indexing of the linear rail slide block assembly component according to the specific angle of any base circle spiral angle; the dividing table is used to drive the rotation of linear rail slide block assembly component, which can adjust the angle between the intersection line of the working plane A of fixed rail and the working plane B of fixed rail and the axis of the gear helix artifact, and realize the helix deviation measurement of the gear helix artifact with arbitrary base circle helix angle;

the helix artifact rolling component consist of the base-circle plates, a gear helix artifact and the multi-ball axle sleeves, the cross washers, the plain washers are respectively assembled on both shaft ends of the gear helix artifact; the gear helix artifact is installed between the inner holes of the two base-circle plates with a locking nut.

2. The pure-rolling generating motion measurement device for gear helix artifact of claim 1, wherein the four working planes of the slide block are subjected to ultra-precision grinding, a polytetrafluoroethylene rail soft belt can be pasted on the four working planes of the slide block, which can meet the accuracy requirements after scraping and grinding.

3. The pure-rolling generating motion measurement device for gear helix artifact of claim 1, wherein the axes of three through holes for installing probe are parallel to each other and parallel to the top plane of the slide block; the diameter of the through holes for installing probe is slightly larger than that of the inductor micro-displacement probe.

4. The pure-rolling generating motion measurement device for gear helix artifact of claim 1, wherein the included angle of the working plane A of fixed rail and the working plane B of fixed rail is 60°~120°.

5. A pure-rolling generating motion measurement method for the gear helix artifact realized by using the pure-rolling generating motion measurement device according to claim 1, comprising the following steps:

(1) drive the gear helix artifact for pure-rolling generating motion;

the two shaft ends of the gear helix artifact are respectively equipped with a multi-ball axle sleeve, a cross washer and a plain washer, and the gear helix artifact is installed between the inner holes of the two base-circle plates with a locking nut; when the two base-circle plates are rolled along the generating rails to the middle position of the effective measuring stroke, measure the height of the two generatrix of the two base-circle plates with the altimeter, and then adjust the position of linear rail slide block assembly component, in which the two base-circle plates generatrix on the plane passing through the geometric centers of two base-circle plates and parallel to the working plane of generating rails; it can ensure that the two base-circle plates always carry out pure-rolling generating motion along the extension direction of the working plane of generating rails, and drive the gear helix artifact to carry out pure-rolling movement;

(2) determine the installation height and measurement direction of the inductor micro-displacement probe;

drive the dividing table to rotate, and the rotation angle is the base circle helix angle of the gear helix artifact to be measured, then the linear rail slide block assembly component and the inductor micro-displacement probe rotate the corresponding angle with the dividing table; the installation height of inductor micro-displacement probe is a fixed value, in which the height of the measuring point is the installation height of the working plane of generating rails, so that the measurement is always carried out in the tangent plane of the base cylinder of the gear helix artifact; the inductor micro-displacement probe shall be adjusted to the dividing circle along the tangent direction of the base circle of the gear helix artifact, and the measurement direction of inductor micro-displacement probe shall always be the normal direction of the flank of the gear helix artifact; then the motion track of the inductor micro-displacement probe is a straight line, which is parallel to the intersection of the working plane A of fixed rail and the working plane B of fixed rail, and the included angle between the straight line and the axis of gear helix artifact is the base circle helix angle, and the motion track of the measuring point is the contact line of the flank of gear helix artifact;

(3) realize the motion matching between the gear helix artifact and the inductor micro-displacement probe;

the given angular speed of pure-rolling of gear helix artifact is w(rad/s), then the pure-rolling speed of gear helix artifact is $v_{ha}=(w·r_b·\pi)/180$ (mm/s), and $r_b$ is the radius of the base cylinder of gear helix artifact; when the inductor micro-displacement probe moving in a straight line in the direction of that forms a base circle helix angle $\beta_b$ with the axis of the base cylinder of the gear helix artifact, according to the trigonometric function relationship, it can be seen that the moving speed of the inductor micro-displacement probe is $v_p=(w·r_b·\pi)/(180·\sin \beta_b)$(mm/s); therefore, when the motion speeds of the gear helixartifact and the inductor micro-displacement probe meet the above two relations respectively, the proportional motion matching relationship is realized, which can ensure that the measuring point of the inductor micro-displacement probe is always located on the dividing cylindrical surface of the gear helix artifact, and carry out real-time dynamic measurement along the contact line of the flank of gear helix artifact;

(4) set the measurement data acquisition density, filter and compensate the measured data;

when the measurement data acquisition density within the measured length is reasonably set, the data shall include a minimum 300 points or 5 points per millimeter; after the measurement data acquisition is completed, according to the judgment rules of coarse error, the data filtering is needed to eliminate the coarse error data; and finally the error compensation is carried out for the data obtained by the inductor micro-displacement probe.

* * * * *